(12) United States Patent
Barnett

(10) Patent No.: US 10,974,219 B2
(45) Date of Patent: Apr. 13, 2021

(54) MICRO REFORMER

(71) Applicant: BD Energy Systems, LLC, Houston, TX (US)

(72) Inventor: Daniel Joseph Barnett, Katy, TX (US)

(73) Assignee: BD Energy Systems, LLC, Houston, TX (US)

( * ) Notice: Subject to any disclaimer, the term of this patent is extended or adjusted under 35 U.S.C. 154(b) by 0 days.

(21) Appl. No.: 16/771,846

(22) PCT Filed: Dec. 19, 2018

(86) PCT No.: PCT/US2018/066606
§ 371 (c)(1),
(2) Date: Jun. 11, 2020

(87) PCT Pub. No.: WO2019/126392
PCT Pub. Date: Jun. 27, 2019

(65) Prior Publication Data
US 2021/0053021 A1    Feb. 25, 2021

Related U.S. Application Data

(60) Provisional application No. 62/608,175, filed on Dec. 20, 2017.

(51) Int. Cl.
*B01J 19/00* (2006.01)
*C01B 3/38* (2006.01)
*C10G 2/00* (2006.01)

(52) U.S. Cl.
CPC ......... *B01J 19/0093* (2013.01); *B01J 19/006* (2013.01); *B01J 19/0013* (2013.01);
(Continued)

(58) Field of Classification Search
CPC .. B01J 19/0093; B01J 19/006; B01J 19/0013; B01J 2219/0017; B01J 2219/00157;
(Continued)

(56) References Cited

U.S. PATENT DOCUMENTS

| 4,113,441 A | 9/1978 | Suzuki et al. |
| 4,820,314 A | 4/1989 | Cohen et al. |

(Continued)

FOREIGN PATENT DOCUMENTS

| WO | 2004029511 | 4/2004 |
| WO | 2006031163 | 3/2006 |

OTHER PUBLICATIONS

Whittenberger, "Structured catalysts for steam reformers," Catalysis 2015, p. 31 (2015) [available at [https://www.eptq.com].
(Continued)

*Primary Examiner* — Jafar F Parsa
(74) *Attorney, Agent, or Firm* — Daniel N. Lundeen; Lundeen & Lundeen PLLC

(57) ABSTRACT

A reformer suitable for micro-scale design has horizontal catalyst tube(s) passing through a baffled radiant section for convective and radiant heat transfer to the tube(s). To reduce the footprint and/or to facilitate field assembly a combustion chamber and convection section can be oriented transversely with respect to the radiant section; the tube(s) can be horizontal and/or include structured catalyst; and/or the combustion chamber provides flameless combustion or produces a flame without impinging on the tubes. Also, a skid frame-mountable version of the reformer; and a process for transporting, assembling, and/or operating the steam methane reformer.

39 Claims, 7 Drawing Sheets

(52) U.S. Cl.
CPC ............. *C01B 3/384* (2013.01); *C10G 2/30* (2013.01); *B01J 2219/00117* (2013.01); *B01J 2219/00157* (2013.01); *B01J 2219/00873* (2013.01); *C01B 2203/0233* (2013.01); *C01B 2203/062* (2013.01); *C01B 2203/0811* (2013.01); *C01B 2203/0833* (2013.01); *C01B 2203/1235* (2013.01)

(58) Field of Classification Search
CPC ... C10G 2/30; C01B 8/384; C01B 2203/0833; C01B 2203/1235; C01B 2203/0233; C01B 2203/062; C01B 2203/0811
See application file for complete search history.

(56) References Cited

U.S. PATENT DOCUMENTS

| | | | |
|---|---|---|---|
| 4,847,051 A | 7/1989 | Parenti | |
| 4,904,455 A | 2/1990 | Karafian et al. | |
| 5,470,360 A | 11/1995 | Sederquist | |
| 5,954,121 A | 9/1999 | Rexford et al. | |
| 6,007,326 A | 12/1999 | Ryan, III et al. | |
| 6,773,256 B2 | 8/2004 | Joshi et al. | |
| 6,818,028 B2 | 11/2004 | Barnett et al. | |
| 7,320,778 B2 | 1/2008 | Whittenberger | |
| 7,906,079 B2 | 3/2011 | Whittenberger et al. | |
| 8,318,368 B2 | 11/2012 | Kaye et al. | |
| 8,439,102 B1 | 5/2013 | Collins, III et al. | |
| 8,915,731 B2 | 12/2014 | Kang et al. | |
| 9,216,394 B2 | 12/2015 | Whittenberger et al. | |
| 9,751,073 B2 | 9/2017 | Whittenberger et al. | |
| 2004/0134127 A1* | 7/2004 | Pham | C01B 3/384 48/198.7 |
| 2007/0254251 A1 | 11/2007 | Cao et al. | |
| 2015/0027053 A1 | 1/2015 | Lin et al. | |
| 2016/0017794 A1 | 1/2016 | Bromberg et al. | |
| 2016/0320127 A1 | 11/2016 | Collins, III et al. | |
| 2017/0183228 A1 | 6/2017 | Lin et al. | |

OTHER PUBLICATIONS

Design and Evaluation of Heat Utilization Systems for the High Temperature Engineering Test Reactor; IAEA-TECDOC-1236, Vienna, Aug. 2001.

Wesenberg, Gas Heated Steam Reformer Modelling, Norwegian University of Science and Technology, Department of Chemical Engineering, Trondheim, Apr. 2006.

Rosli, et al., Simulation of ethane steam cracking with severity evaluation, 2016 IOP Conf. Ser.: Mater. Sci. Eng. 162 012017.

\* cited by examiner

MICRO REFORMER

RELATED APPLICATIONS

This application is a national stage entry of PCT/US2018/066606, which is a non-provisional of and claims the benefit of priority to earlier application U.S. 62/608,175 filed 20 Dec. 2017.

U.S. GOVERNMENT RIGHTS

None.

FIELD OF THE INVENTION

The present invention relates to micro-scale reformers and reforming processes.

BACKGROUND

A small or "micro" reformer, such as, for example, a steam methane reformer (SMR), is one that produces syngas at a capacity for making between 1 and 100 BPD of liquid hydrocarbons in a Fischer-Tropsch gas-to-liquid (GTL) process. Micro reformers have not generally been used at low capacity, e.g., to process low-Btu landfill gas, or remote or "stranded" natural gas from oil production. SMR reactors typically consist of vertically oriented, catalyst-filled tubes 12 meters or more in length mounted with spring hangers, and have an unacceptably high profile for micro-scale assembly and operation at a remote location. Moreover, operating temperatures of 850° C. and pressures of 15-25 atm complicate cost-effective, small-scale design.

The industry needs a compact, cost-effective reformer design having a lower profile that can be assembled on a single level without stacking and/or on a smaller footprint, suitable for skid mounting, transport, and/or assembly, yet is operable at a low capacity with high efficiency, low methane slip, and low NOx emissions.

SUMMARY OF THE INVENTION

The present invention is directed to a micro reformer having a baffled radiant section, a horizontal tube orientation, and/or a transverse combustion chamber and/or convection section orientation with respect to the radiant section. The design can use radiant tubes that are shorter than conventional spring-hung vertical tubes, e.g., less than 9 or 10 m. The tubes, as well as the combustion chamber and/or convection section, can be horizontally oriented to further reduce the profile to facilitate assembly on a single level without stacking. The design has a relatively small footprint, and is suitable for skid mounting, transport, and/or assembly, e.g., having a maximum module dimension. Moreover, the reformer design is operable at a low capacity with high efficiency and low methane slip.

In one aspect of the invention, a reformer, e.g., a steam methane reformer (SMR), comprises a combustion chamber in communication with a longitudinal radiant section to supply flue gas from a burner to the radiant section; a horizontal tube passing longitudinally through the radiant section; catalyst disposed in the tube to reform a feed gas comprising hydrocarbon and steam; a refractory lining in the radiant section for radiant heat transfer to the tube; and at least one baffle in the radiant section to direct a flow path of the flue gas transversely across the horizontal tube for convective heat transfer to the tube. Preferably, the combustion chamber is transversely oriented with respect to the radiant section, and (a) the reformer further comprises a plurality of the horizontal tubes passing through the radiant section in spaced relation with the burner to avoid flame impingement, or (b) preferably wherein the burner provides flameless combustion.

In another aspect of the invention, a reformer, e.g., an SMR, comprises: one or a plurality of horizontal tubes passing longitudinally through a radiant section comprising a refractory lining for radiant heat transfer to the tubes; at least one baffle in the radiant section to direct a flow path of flue gas transversely across the tubes for convective heat transfer to the tubes; a transversely oriented combustion chamber in communication with the radiant section to supply the flue gas to the radiant section; a burner in the combustion chamber to provide flameless combustion or to provide a flame spaced sufficiently to avoid flame impingement on the tubes; a structured catalyst disposed in the tubes to reform a feed gas comprising hydrocarbon and steam; and a transversely oriented convection section to pass the flue gas from the radiant section in heat exchange relation with a combustion air preheater to provide preheated air to the burner, and with a feed gas preheater to supply preheated feed gas the tubes.

In another aspect, the present invention provides a preferably skid frame-mountable micro reformer (e.g., a maximum dimension of less than 12 m) comprising a combustion chamber module, a radiant section module, and a convection section module. The combustion chamber module comprises a burner in a combustion chamber to supply flue gas. The radiant section module comprises a longitudinal radiant section, a horizontal tube passing longitudinally through the radiant section, a refractory lining in the radiant section for radiant heat transfer to the tube, at least one baffle in the radiant section to direct a flow path of the flue gas transversely across the horizontal tube for convective heat transfer to the tube, and a structured catalyst disposed in the tube to reform a feed gas comprising hydrocarbon and steam. The convection section module comprises a convection section to pass flue gas from the radiant section in heat exchange relation with a combustion air preheater and a feed gas preheater. The combustion chamber and the convection section have ends mateable in transverse orientation with respect to the radiant section for connection to respective first and second ends of the radiant section. Optionally, the reformer can comprise one or more skid frames for mounting the combustion chamber or module, the radiant section or module, the convection section or module, or a combination thereof.

In any embodiment, the reformer can comprise a plurality of the baffles, wherein the baffles comprise transverse ceramic walls spaced along the radiant section; a first set of openings formed in each ceramic wall to receive and support the tubes; and a passageway, preferably a second set of openings, formed through each ceramic wall on alternating sides of the tubes for cross-flow of the flue gas across the tubes. The baffles preferably comprise hexagonal blocks, more preferably interlocking ceramic blocks.

In any embodiment, the reformer can comprise a transversely oriented convection section to pass the flue gas from the radiant section in heat exchange relation with a combustion air preheater to provide preheated combustion air to the burner, and/or in heat exchange relation with a feed gas preheater to supply preheated feed gas to the tubes. For example, the feed gas preheater can comprise a plurality of coils disposed in the convection section, and a like plurality of crossovers can be used to supply the preheated feed gas from the coils to respective ones of the horizontal tubes. If desired, respective temperature control systems can be provided to independently control the temperature of effluent from each of the horizontal tubes, e.g., wherein the control systems each comprise a temperature sensor to detect the temperature in the effluent from one of the tubes and a valve positioned between a feed gas manifold and a respective coil to regulate the supply of feed gas to the respective coil in response to the detected effluent temperature.

In any embodiment, the reformer can comprise a plurality of the horizontal tubes passing longitudinally through the radiant section, and a plurality of supplemental tubes passing longitudinally through the radiant section. Preferably, the horizontal tubes and the supplemental tubes are arranged in respective rows. More preferably, the plurality or row of supplemental tubes comprise structured catalyst disposed therein to reform the feed gas, or are selected from steam cracking tubes, hydrocracking tubes, Fischer-Tropsch synthesis tubes, or a combination thereof.

In any embodiment, the combustion chamber can be oriented vertically above the radiant section or horizontally to one side of the radiant section. Vertical orientation can reduce plot space, whereas the horizontal orientation can lower the profile, facilitate transportation and/or field assembly. Often, the combustion chamber is oriented transversely to a side of the radiant section, and the convection section is oriented transversely on the same side of the radiant section, e.g., where the combustion chamber and convection section are horizontal.

In any embodiment, the reformer can comprise a fan to draw air from an intake, through the air preheater, and to force the preheated air into the combustion chamber. The reformer preferably comprises a flue gas recycle line to pass a portion of the flue gas from the convection section to the fan. This recycle may facilitate NOx reduction.

In any embodiment, the reformer can comprise a supplemental heat transfer loop through the convection section to recover heat for another process stream, preferably wherein the other process stream comprises feedstock to a steam cracker, hydrocracker, Fischer-Tropsch synthesis reactor, or a combination thereof.

In any embodiment, the reformer can further comprise a stack to discharge the flue gas from the convection section. If desired, the reformer can comprise a plurality of modules for independent transportation to a construction site, e.g., a combustion chamber module, a radiant section module, a convection section module, and/or a stack module, and so on.

In another aspect of the invention, a method comprises: connecting a combustion chamber to communicate with a longitudinal radiant section to supply flue gas from a burner; passing a horizontal tube longitudinally through the radiant section; lining the radiant section with a refractory material for radiant heat transfer to the tube; installing at least one baffle in the radiant section to direct a flow path of the flue gas transversely across the horizontal tube for convective heat transfer to the tube; and disposing a structured catalyst in the tube to reform a feed gas comprising hydrocarbon and steam. The combustion chamber preferably comprises a single burner.

In another aspect of the invention, a reforming process to produce synthesis gas comprises supplying flue gas to a longitudinal radiant section of a reformer from a burner in a combustion chamber in communication with the radiant section; reforming a feed gas comprising hydrocarbon and steam in a horizontal tube comprising catalyst disposed therein and passing longitudinally through the radiant section; transferring radiant heat to the tube from a refractory lining in the radiant section; and directing a flow path of the flue gas transversely across the horizontal tube with at least one baffle in the radiant section for convective heat transfer to the tube. The process preferably comprises orienting the combustion chamber transversely with respect to the radiant section, and (a) spacing a plurality of the horizontal tubes passing through the radiant section in relation to the burner to avoid flame impingement or preferably (b) providing flameless combustion from the burner.

In a preferred embodiment of the invention, a reforming process to produce synthesis gas comprises: supplying flue gas to a longitudinal radiant section of a reformer from a burner in a combustion chamber in communication with the radiant section; reforming a feed gas comprising hydrocarbon and steam in a horizontal tube comprising catalyst disposed therein and passing longitudinally through the radiant section; transferring radiant heat to the tube from a refractory lining in the radiant section; and directing a flow path of the flue gas transversely across the horizontal tube with at least one baffle in the radiant section for convective heat transfer to the tube.

In any embodiment, the process can comprise: spacing a plurality of the baffles along the radiant section, wherein the baffles comprise transverse ceramic walls; receiving and supporting the tubes in a first set of openings formed in each ceramic wall; and forming a passageway, preferably comprising a second set of openings, through each ceramic wall on alternating sides of the tubes for cross-flow of the flue gas across the tubes. The ceramic walls are preferably assembled from hexagonal blocks, preferably by interlocking the blocks.

In any embodiment, the feed gas preheater can comprise a plurality of coils disposed in the convection section, and the process can comprise supplying the preheated feed gas from the coils through a like plurality of crossovers to respective ones of the horizontal tubes. Preferably, the process further comprises independently controlling the temperature of effluent from each of the horizontal tubes with respective temperature control systems, preferably wherein the control comprises detecting a temperature in the effluent from one of the tubes with a temperature sensor of the control system, and regulating the supply of feed gas to the respective coil in response to the detected effluent temperature using a valve positioned between a feed gas manifold and a respective coil.

In any embodiment, the process can comprise passing a plurality of the horizontal tubes longitudinally through the radiant section, and passing a plurality of supplemental tubes longitudinally through the radiant section. Preferably, the horizontal tubes and the supplemental tubes are arranged in respective rows. The plurality or row of supplemental tubes can comprise structured catalyst disposed therein to reform the feed gas, or can be selected from steam cracking tubes, hydrocracking tubes, Fischer-Tropsch synthesis tubes, or a combination thereof.

In any embodiment, the process can comprise orienting the combustion chamber vertically above the radiant section to reduce plot space, or horizontally to facilitate transportation and/or field assembly. In any embodiment, the process can comprise orienting the combustion chamber transversely to a side of the radiant section, and orienting the convection section transversely on the same side of the radiant section, preferably wherein the combustion chamber and convection section are horizontal.

In any embodiment, the process can comprise drawing air from an intake, through the air preheater, to a fan, and forcing the preheated air into the combustion chamber, and preferably further comprising passing a portion of the flue gas from the convection section through a flue gas recycle line to the fan.

In any embodiment, the process can comprise recovering heat from a supplemental heat transfer loop through the convection section for another process stream. Preferably, the other process stream comprises feedstock to a steam cracker, hydrocracker, Fischer-Tropsch synthesis reactor, or a combination thereof.

In any embodiment, the process can comprise discharging the flue gas from the convection section to a stack.

In any embodiment, the process can comprise transporting the reformer to a construction site as a plurality of modules, preferably a combustion chamber module comprising the combustion chamber, a radiant section module comprising the radiant section, and a convection section module comprising the convection section, and optionally assembling the reformer on a skid.

In any embodiment, the process can comprise supplying the syngas from the reformer to a Fischer-Tropsch synthesis process to produce liquid hydrocarbons, preferably at a rate of 1-100 BPD.

DETAILED DESCRIPTION OF THE INVENTION

Figure 1:
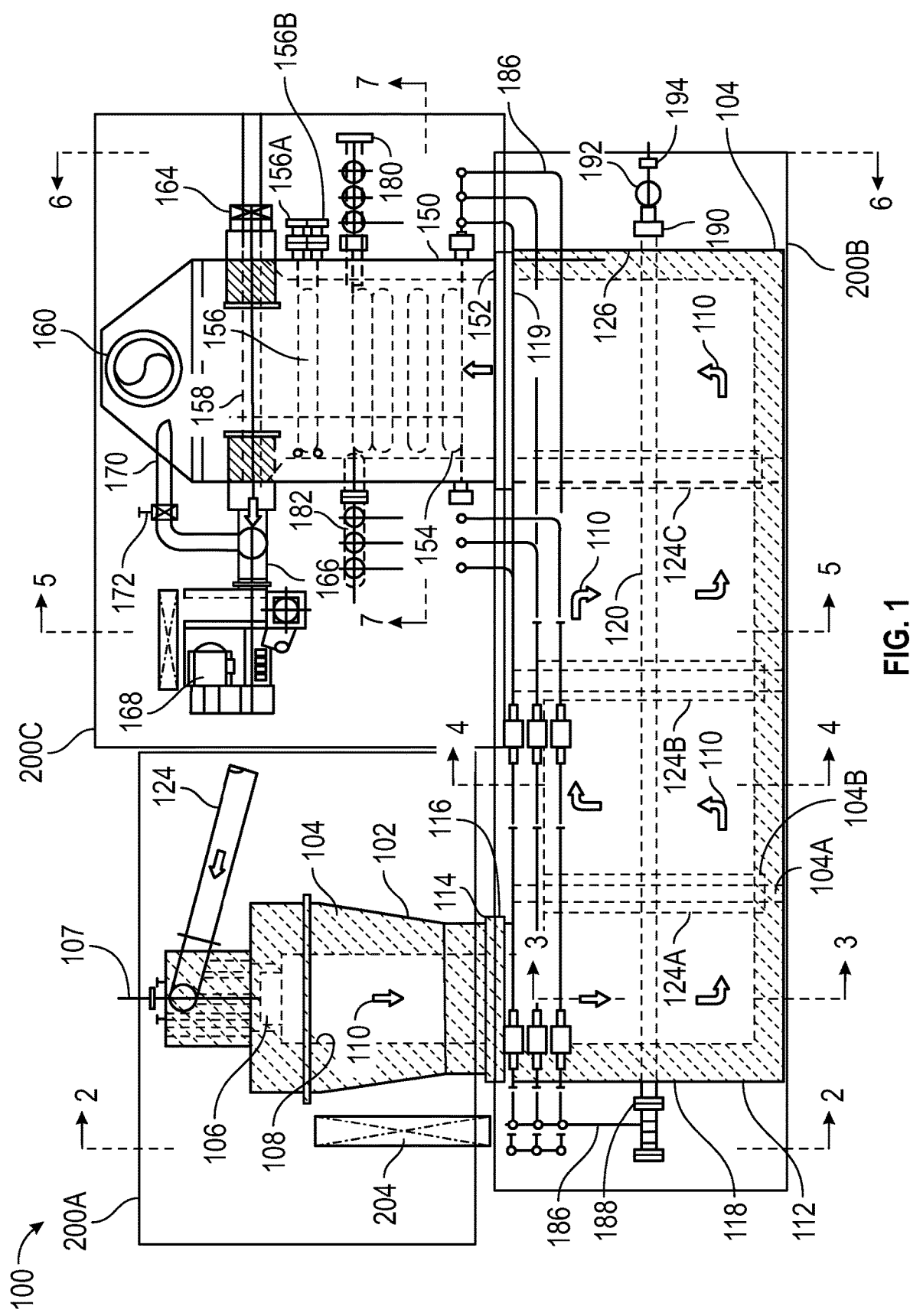
FIG. 1 is a plan view of a reformer according to embodiments of the present invention.

The following definitions are applicable herein:

Adjacent—nearby, next to or adjoining.

Baffle—a structure such as a vane, wall, or panel used in a process vessel to direct or obstruct the flow of fluid and or hold tubes in position.

Block (brick)—a large solid or hollow piece of hard material, especially rock, stone, concrete, refractory, or wood, typically with generally flat surfaces on each side.

BPD—42 US gallon barrels per day.

Burner—the part of a fuel-burning device where the flame or heat is produced.

Ceramic—an inorganic compound, non-metallic, solid material comprising metal, non-metal, and/or metalloid atoms primarily held in ionic & covalent bonds.

Chamber—a generally enclosed area.

Coil—an arrangement of pipes or tubes in a spiral or loop.

Combustion—a high-temperature exothermic chemical reaction between a fuel and an oxidant that produces a gaseous effluent.

Control—determine the behavior or supervise the running of.

Convection section—a portion of a furnace predominated by convective heat transfer. Convective—heat transfer in a fluid by movement of the fluid from one region to another.

Crossover—a point or place of crossing from one side to the other; the piping connecting the convection section mixed feed coil outlet or the feed preheater coil outlets, with the inlet or inlet manifold of the catalyst tubes.

Diameter—the distance along a straight line passing transversely from side to side through the center of a body or figure, especially a circle or sphere; the radius is half the diameter.

Direct—aim toward a particular point or area.

Disposing—putting or arranging in a particular place or way. Used synonymously with placing and positioning.

Draw—to cause to enter by suction.

Each—used to refer to every one of two or more things, regarded and identified separately.

Effluent—that which flows out.

Embodiments—non-limiting tangible or visible forms of an idea or quality according to the present disclosure or invention.

End—the furthest or most extreme part or point of something.

Enter—come or go into.

Facilitate—make easy or easier.

Fischer-Tropsch synthesis—the conversion of a mixture of carbon monoxide and hydrogen into liquid hydrocarbons.

Flame—a hot glowing body of ignited gas generated by something on fire.

Flameless combustion—a combustion mode with dilute fuel above self-ignition temperature without a detectable flame front.

Flow—to issue or move in a stream.

Flue gas—the mixture of gases resulting from combustion and other reactions in a furnace. Force—to push or blow.

Furnace—a structure or apparatus in which heat may be generated at very high temperatures.

Horizontal—parallel to the plane of the horizon; at right angles to the vertical.

Hydrocracking—a petrochemical process in which hydrocarbons are catalytically broken down into smaller hydrocarbons at high temperature in the presence of hydrogen.

Insert—a thing that is placed or fit into another thing.

Interlocking—engaging with each other by overlapping or by fitting together projections and recesses.

Length—measurement or extent of something along its greatest dimension.

Light hydrocarbons—hydrocarbons having from 1 to 4 carbon atoms.

Longitudinal—running or along the length of a body; pertaining or extending along the long axis of a body.

Mounted—placed or fixed in position on a structure.

Near—located a short distance away.

Open—allowing access, passage, or a view through an empty space; not closed or blocked up.

Operating temperature, radiant section—the process fluid (coil) outlet temperature.

Pass—move or cause to move in a specified direction.

Passage—a path, channel, or duct through, over, or along which something may pass.

Passageway—a way for passing into, through, or out of something.

Path—the route or course along which something travels or moves.

Plot—the horizontal area designated for something.

Plurality—two or more.

Preheat—to heat before using.

Radiant—heat transmitted by radiation.

Radiant section—a section of a furnace where radiant heat transfer predominates.

Recover—get back or regain.

Reformer—a reactor that uses externally heated catalyst tubes to convert a mixture of steam and light hydrocarbons to a carbon monoxide/hydrogen syngas. The light hydrocarbons may (or may not) contain methane, biogas, naphtha, etc. Such reformers are sometimes referred to as a steam methane reformer (SMR), even though the feedstock may comprise or be naphtha or another light hydrocarbon other than methane. References herein to SMR's are not limited to any particular feedstock, but indicate a preference for methane.

Reformer, micro—a reformer capable of operating at a rate of syngas production to meet the requirements for Fischer-Tropsch synthesis at 1-100 BPD of liquid hydrocarbons, e.g., wherein the hydrocarbon feed rate to the reformer is from about 20 kg/h (44 lb/h) to about 2300 kg/h (5070 lb/h), preferably less than about 1150 kg/h (2540 lb/h), and more preferably less than about 600 kg/h (1320 lb/h).

Refractory—a substance or material that is resistant to heat.

Respective—belonging or relating separately to each of two or more people or things.

Row—a number of things in a more or less straight line.

Set—a group or collection of similar things.

Skid frame—a frame on which a process module is mounted. The frames herein are preferably less than 12 m, more preferably less than about 10 m, and especially less than or equal to about 9 m.

Spacing—the arranging of the distance between things.

Steam cracking—a petrochemical process in which hydrocarbons are broken down into smaller hydrocarbons at a very high temperature in the presence of steam and absence of oxygen.

Structured catalyst—a catalytic material bonded, placed, or painted on a non-free flowing physical form to immobilize it in position with respect to the reactor surfaces.

Through—moving or lying in one side and out another.

Tube—an elongated hollow cylinder.

Vertical—in a direction or alignment such that the top is directly above the bottom.

Wall—a structure enclosing or shutting off a space.

In some embodiments of the invention, a steam methane reformer comprises a combustion chamber in communication with a longitudinal radiant section to supply flue gas from a burner, preferably a single burner, to the radiant section; a horizontal tube passing longitudinally through the radiant section; catalyst, preferably a structured catalyst, disposed in the tube to reform a feed gas comprising hydrocarbon and steam a refractory lining in the radiant section for radiant heat transfer to the tube; and at least one baffle in the radiant section to direct a flow path of the flue gas transversely across the horizontal tube for convective heat transfer to the tube.

Preferably, the steam methane reformer further comprises: a row of the horizontal tubes passing through the radiant section in spaced relation with the burner, preferably to avoid flame impingement, or preferably wherein the burner provides flameless combustion; a plurality of the baffles comprising transverse ceramic walls spaced along the radiant section; a first set of openings formed in each ceramic wall to receive and support the row of tubes; and a passageway, preferably a second set of openings, formed through each ceramic wall on alternating sides of the tubes for cross-flow of the flue gas through the tube row. The ceramic walls are preferably constructed from hexagonal blocks, preferably interlocking blocks.

In some embodiments, the reformer comprises a plurality of coils disposed in a convection section to preheat the feed gas, and a like plurality of crossovers to supply the preheated feed gas to respective ones of the horizontal tubes. Preferably, respective temperature control systems are provided to separately control the temperature of effluent from each of the horizontal tubes. The control systems may each comprise a temperature sensor to detect the temperature in the effluent from one of the tubes and a valve positioned between a feed gas manifold and a respective coil to regulate the supply of feed gas to the respective coil in response to the detected effluent temperature.

Preferably, a second plurality of horizontal tubes, also preferably in a row, passes longitudinally through the radiant section between the alternating second sets of openings. The second plurality or row of tubes may comprise the structured catalyst disposed therein to reform the feed gas comprising methane and steam, or may comprise steam cracking feedstock, hydrocracking feedstock, Fischer-Tropsch synthesis gas, or another process stream for a related or unrelated process.

The combustion chamber is preferably oriented transversely with respect to the radiant section, e.g., vertically above the radiant section to reduce plot space, or horizontally adjacent the radiant section to facilitate transportation and/or field assembly.

The reformer may also have a convection section, preferably oriented transversely with respect to the radiant section, to receive flue gas from the radiant section.

The reformer may also have a fan to draw air from an intake, through an air preheater disposed in a convection section in heat exchange relation with the flue gas, and to force the preheated air into the combustion chamber. Preferably, a flue gas recycle line is provided to pass a portion of the flue gas from the convection section to the fan, e.g., to facilitate lowering NOx emissions.

If desired, a supplemental heat transfer loop may pass through a convection section to recover heat for another process stream. For example, the other process stream may comprise feedstock to a steam cracker, hydrocracker, Fischer-Tropsch synthesis reactor, or the like.

In some embodiments, the reformer may further comprise a convection section receiving the flue gas from the radiant section in heat exchange relation with a combustion air preheater, a feed gas preheater, another process stream, or a combination thereof; and a stack to discharge the flue gas from the convection section.

In another aspect, the present invention provides a preferably skid frame-mounted or mountable steam methane reformer comprising: a combustion chamber module and a convection section module having ends mateable, preferably in transverse orientation, for connection to respective first and second ends of a radiant section module; wherein the combustion chamber module comprises a combustion chamber to supply flue gas from a burner, preferably a single burner, to the radiant section module when connected thereto; wherein the radiant section module comprises a radiant section, a horizontal tube passing longitudinally through the radiant section, a refractory lining in the radiant section for radiant heat transfer to the tube; at least one baffle in the radiant section to direct a flow path of the flue gas transversely across the horizontal tube for convective heat transfer to the tube; and a structured catalyst disposed in the tube to reform a feed gas comprising hydrocarbon and steam; wherein the convection section module comprises a convection section oriented transversely with respect to the radiant section to pass flue gas from the radiant section, when connected, thereto in heat exchange relation with a combustion air preheater, a feed gas preheater, another process stream, or a combination thereof; and optionally one or more skid frames for mounting the combustion chamber, the radiant section, the convection section, or a combination thereof.

In another aspect of the invention, a method comprises: connecting a combustion chamber to communicate with a longitudinal radiant section to supply flue gas from a burner in the combustion chamber, preferably a single burner; passing a horizontal tube longitudinally through the radiant section; lining the radiant section with a refractory material for radiant heat transfer to the tube; installing at least one baffle in the radiant section to direct a flow path of the flue gas transversely across the horizontal tube for convective heat transfer to the tube; and disposing a structured catalyst in the tube to reform a feed gas comprising hydrocarbon and steam.

Preferably, the method further comprises: spacing a row of the horizontal tubes passing through the radiant section from the burner, preferably to avoid flame impingement, preferably wherein the burner is flameless; spacing a plurality of the baffles comprising transverse ceramic walls along the radiant section; forming a first set of openings in each ceramic wall to receive and support the row of tubes; and forming a passageway, preferably a second set of openings, through each ceramic wall on alternating sides of the tubes for cross-flow of the flue gas through the tube row. Preferably, the method comprises assembling the ceramic walls from interlocking blocks, preferably hexagonal blocks.

Preferably, the method further comprises disposing a plurality of coils in a convection section to preheat the feed gas, and a like plurality of crossovers to supply the preheated feed gas to respective ones of the tubes in the row. More preferably, the method further comprises independently controlling temperature of effluent from each of the horizontal tubes. In one embodiment, the method may comprise detecting the temperature in the effluents from the tubes and, in response to the detected effluent temperatures, regulating the supply of feed gas to the respective coils, preferably using valves positioned between a feed gas manifold and respective coils.

In another embodiment, the method further comprises passing a second plurality of horizontal tubes longitudinally through the radiant section, also preferably in a row(s) between the alternating second sets of openings. The second plurality of tubes may also have the structured catalyst disposed therein to reform the feed gas comprising methane and steam, and/or the method may include supplying steam cracking, hydrocracking, and/or Fischer-Tropsch synthesis feedstock to the second plurality of tubes. Where steam cracking tubes are present, the radiant section of the steam reformer is preferably operated at a sufficiently high temperature to obtain a process gas temperature in the steam cracking tubes of 850° C. or more, preferably 850° C.-950° C. Where Fischer-Tropsch synthesis tubes are present, the radiant section of the steam reformer is preferably operated at a sufficiently high temperature to obtain a process gas temperature in the Fischer-Tropsch synthesis tubes of 840° C. or more, preferably 840° C.-900° C.

In one embodiment, the method further comprises orienting the combustion chamber transversely with respect to the radiant section, for example, vertically above the radiant section to reduce plot space, or horizontally adjacent the radiant section to facilitate shipping and/or field assembly. The method may also include orienting a convection section transversely with respect to the radiant section to receive flue gas therefrom.

The method preferably comprises installing a fan to draw air from an air intake, through an air preheater disposed in a convection section in heat exchange relation with the flue gas, and to force the preheated air into the combustion chamber. As desired, the method can include recycling a portion of the flue gas from the convection section into the preheated air drawn into the fan, e.g., to reduce NOx emissions.

The method may also include heating another process stream in a supplemental heat transfer loop through a convection section, e.g., wherein the other process stream comprises feedstock to a steam cracker, hydrocracker, Fischer-Tropsch synthesis reactor, or the like.

Preferably, the method further comprises heating combustion air, feed gas, another process stream, or a combination thereof in a convection section receiving the flue gas from the radiant section; and discharging the flue gas from the convection section into a stack.

In any embodiment the process feed gas entering the tube(s) in the radiant section can have a temperature ranging from about 950° F. to about 1250° F., preferably a temperature greater than about 1100° F. (600° C.), and more preferably about 1100° F. (600° C.) to 1250° F. (675° C.). In any embodiment the product effluent(s) exiting the tube(s) from the radiant section can have a temperature greater than about 815° C., more preferably about 850° C. to 950° C. (1560° F. to 1750° F.), e.g., from 800° C. to 1000° C., or from about 1450° F. (788° C.) up to about 1525° F. (829° C.), or from about 1550° F. (843° C.) up to 1625° F. (885° C.) or up to about 1650° F. (899° C.). Preferably, the flue gas exiting the radiant section has a bulk temperature greater than 1600° F. (870° C.), e.g., from 870° C. to 1100° C., or from about 1600° F. (870° C.) up to about 2000° F. (1100° C.), or from about 1550° F. (843° C.) up to 1625° F. (885° C.) or up to about 1650° F. (899° C.). The flue gas discharged from the stack can have a temperature less than 100° C., especially where the convection section and stack are designed to withstand corrosion from the condensate, but preferably has a temperature greater than 100° C., more preferably about 120° C. to 150° C.

Preferably, in the method the combustion chamber and the radiant section are pre-assembled and transported to a construction site in separate first and second modules, and connected together at the construction site. If desired, the method may also include pre-assembling and transporting a convection section module to the construction site in a separate third module, and connecting the convection section module to the radiant section module at the construction site; and/or pre-assembling and transporting a stack module to the construction site, and connecting the stack module to the convection section module at the construction site.

With reference to the drawings in which like reference numerals refer to like parts, FIGS. 1-9 show various views and sections of a steam methane reformer 100 according to embodiments of the present invention. A generally cylindrical and/or frustoconical combustion chamber 102 is lined with refractory material 104 and houses a burner 106 for combustion of fuel supplied via line 107. The refractory material 104 may be any suitable heat-resistant refractory material, e.g., ceramic fiber modules, refractory cement, or the like. Although a plurality of burners may be employed, preferably a single burner 106 is employed. The burner 106 is preferably designed for low NOx emissions and especially for flameless combustion, e.g., by mixing or diluting of the fuel and/or combustion air as described in U.S. Pat. Nos. 6,007,326; 6,773,256; 8,915,731; U.S. 2007/0254251; WO 2004/029511; WO 2006/031163; and the like, each of which is hereby incorporated by reference for all jurisdictions where allowed.

Flue gas from the burner 106 flows through cylindrical passageway 108 in the direction indicated by arrows 110 to longitudinal radiant section 112, which is in fluid communication with the combustion chamber 102 to receive the flue gas. If desired, the combustion chamber 102 and the radiant section 112 may be provided with respective mating connections, e.g., flanges 114, 116 to facilitate field assembly, e.g., following separate transportation of each unit. Radiant tubes 120 enter through inlet wall 118, pass longitudinally through the radiant section 112, and are arranged in a row 122. The row 122 is oriented in a vertical plane transverse to the direction of the flue gas flow 110, but could be arranged at any angle, e.g., in a horizontal plane, especially when the combustion chamber 102 is oriented vertically above or below the radiant section 112.

Figure 8:
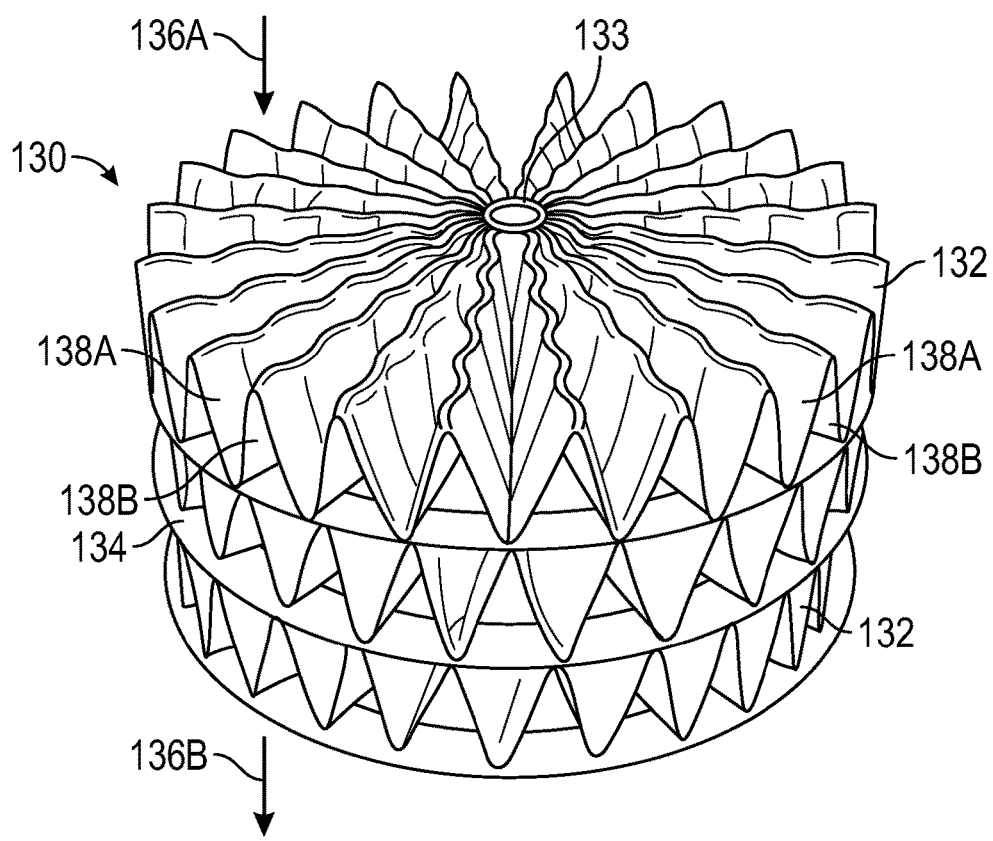
FIG. 8 is perspective view of one example of a structured catalyst suitable for use in the invention according to embodiments disclosed herein.

The tubes 120 preferably have a maximum radiant-heated length less than 12 m, more preferably less than or equal to about 10 m, and especially less than or equal to about 8 m. The tubes 120 contain reforming catalyst, which is preferably a structured catalyst 130, an example of which is seen in FIG. 8. Typical pelleted catalyst media is problematic in horizontal tubes because it can settle and create an open passage over the top of the catalyst through which the reactant gases can preferentially bypass the catalyst-filled lower region of the horizontal tubes, thereby avoiding catalysis. Structured catalysts overcome this issue, normally consisting in a preferably ceramic or metallic substrate configured as a parallel channel monolith, open cell foam, stacked fan and washer arrangement, stacked wire mesh, microchannel reactor, and so on. The substrate provides structural integrity and determines the flow pattern in the reactor. A catalyst typically composed of a porous support material contains the active catalyst and is coated or applied on the surface(s) of the substrate or forming micropacked beds (not shown) inside cavities of the substrate. Preferably, the structured catalyst has an outside diameter (D) matching an inside diameter of the tubes 120, and a length (L) at least as large as the diameter, i.e., an L/D ratio greater than 1.

Structured catalysts are readily available commercially, e.g., from Catacel Corp. (Garrettsville, Ohio), and have been disclosed in various patents and publications, e.g., U.S. Pat. Nos. 7,320,778; 7,906,079; 9,216,394; 9,751,073; U.S. 2017/0183228; Whittenberger, "Structured catalysts for steam reformers," Catalysis 2015, p. 31 (2015) [available at [https://www.]eptq.com], which are hereby incorporated herein by reference in all jurisdictions where allowed. Whittenberger, for example, discloses a CATACEL SSR stacked fan-and-washer catalyst system that is preferred in any embodiment herein.

In the arrangement of FIG. 8, as one example, the structured catalyst 130 comprises multiple fans 132 extending outwardly from support tube 133, and alternatingly sequenced with flat washers 134 having an outside diameter flush with the inside diameter of the respective tube 120 (see FIGS. 1-5). Process fluid 136A, e.g., a mixture of methane and steam, enters in one end, and exits the other end 136B incrementally enriched in hydrogen, carbon monoxide, and/ or carbon dioxide. The fans 132 form radial, triangular-shaped ducts 138A, 138B on either side of the fan 132. Process fluid flows radially outwardly, then inwardly as it passes around the outside of each fan 132 adjacent the inside diameter of the tube 120, and then axially through passages (not shown) formed through the washer adjacent the support tube 133. The fans 132 and washers 134 are typically metal foil supporting active catalyst material applied on the surfaces thereof.

With reference again to FIGS. 1, 3-5, the radiant section 112 is provided with the refractory lining 104 extending contiguously from the combustion chamber 102 to a convection section 150. One or more baffles 124A, 124B, 124C in the radiant section 112 direct the flow path 110 of the flue gas transversely across the radiant tubes 120 to enhance convective heat transfer. The baffles 124A, 124B, 124C are preferably constructed of components made of a heat-resistant refractory material, such as ceramic materials, including alumina, mullite, and the like, using any of the known ceramic manufacturing processes such as slip casting, freeze casting, injection molding, extrusion, machining, or the like, including combinations of these. Preferably the baffles 124A, 124B, 124C are constructed using refractory blocks, preferably hexagonal blocks 140 (FIGS. 3-5), also called "hex-blocks", which may preferably interlock for assembly. Hex-blocks are disclosed, for example, in U.S. Pat. Nos. 5,954,121; 8,439,102; U.S. 2016/0320127; which are hereby incorporated by reference in all jurisdictions where allowed. Hex-blocks are available commercially from Blasch Precision Ceramics, Inc. (Albany, N.Y.).

Figure 3:
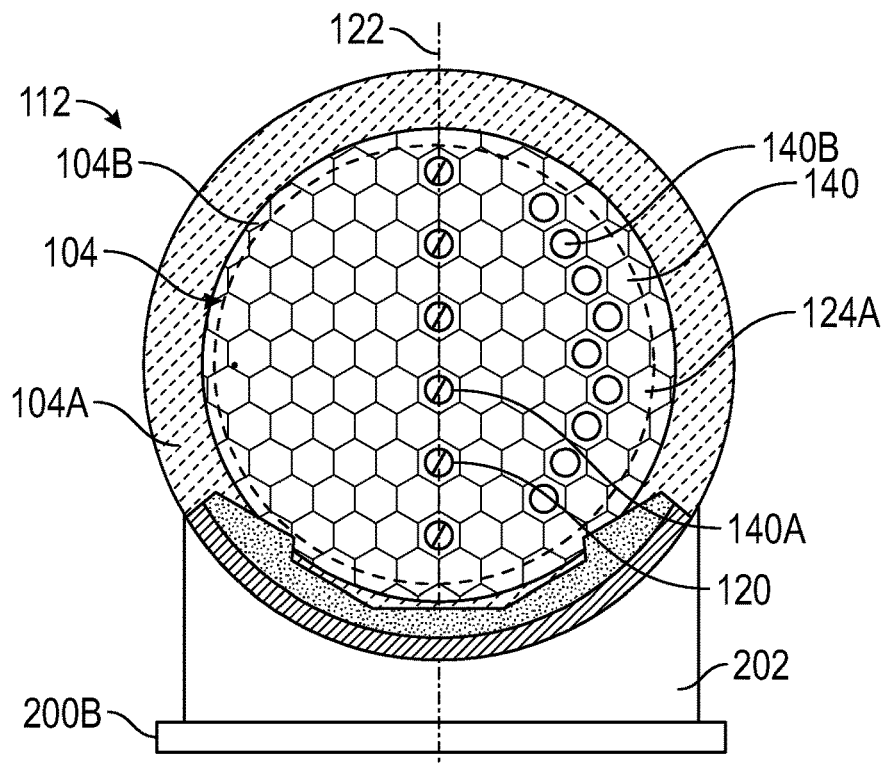
FIG. 3 is a cross-sectional view of the radiant section of the reformer of FIG. 1 as seen along the view lines 3-3.
Figure 4:
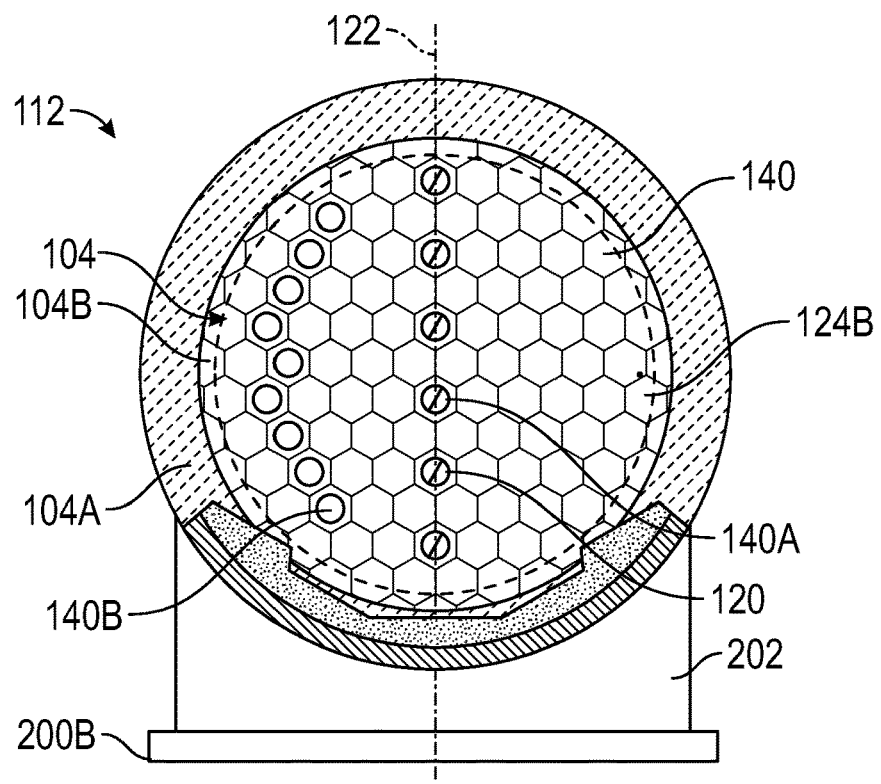
FIG. 4 is another cross-sectional view of the radiant section of the reformer of FIG. 1 as seen along the view lines 4-4.
Figure 5:
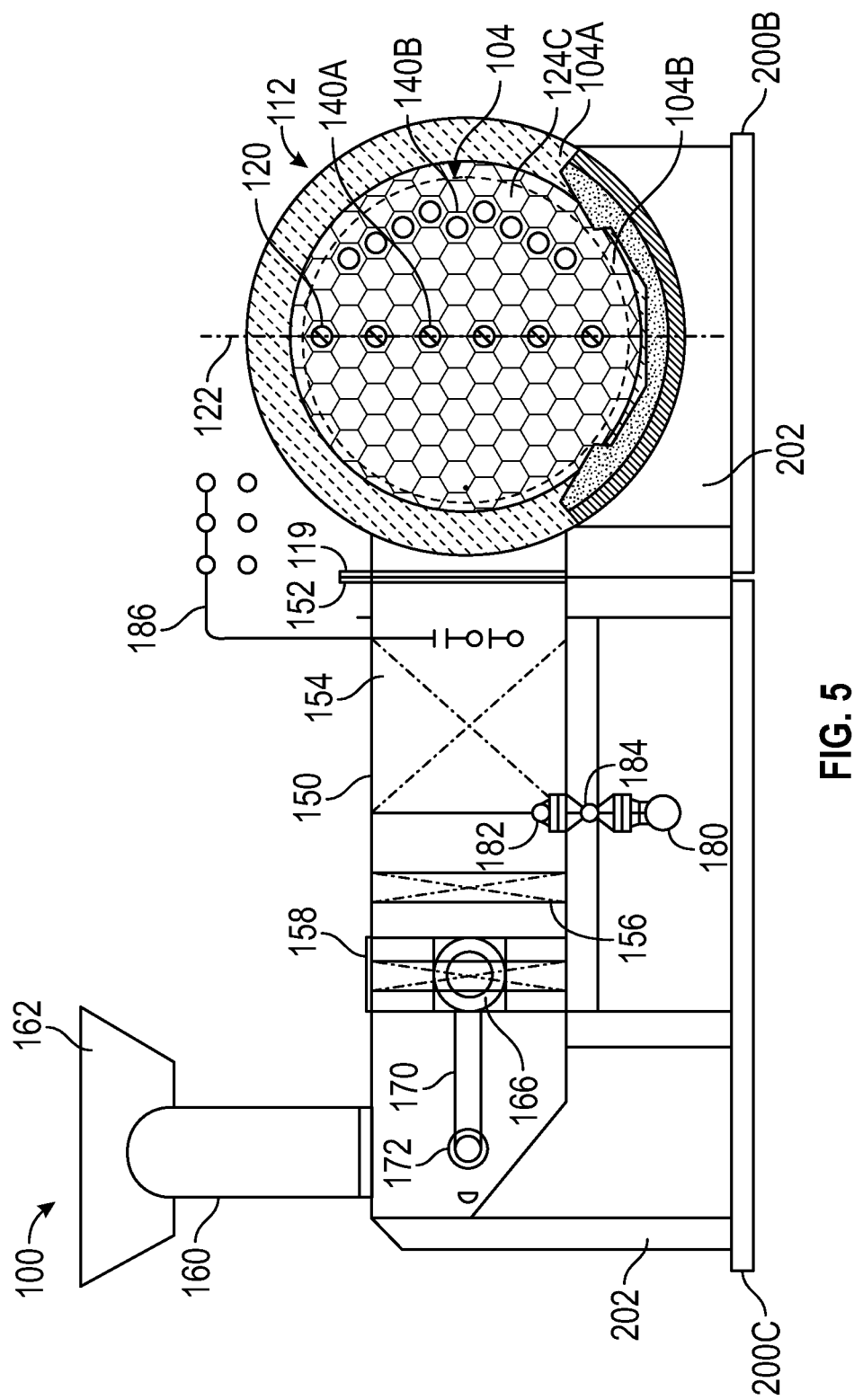
FIG. 5 is an elevational view, partly in cross-section, of the reformer of FIG. 1 as seen along the view lines 5-5.

The baffles 124A, 124B, 124C are constructed of the hex-blocks 140, which are generally solid (imperforate) and stacked to form walls across the radiant section 112. The tubes 120 pass through openings formed through hex-blocks 140A aligned in a vertical row 122 with a centerline of the generally cylindrical radiant section 112. Blocks 140B have passages which permit the flue gas to flow through the baffles 124A, 124B, 124C. These are placed on alternatingly opposite sides with respect to the tube row 122. Thus, FIG. 3 shows the blocks 140B in the baffle 124A on the right, opposite side of the tube row 122 from the flue gas entry from the combustion chamber 102, which is on the left side in this embodiment. As seen in FIG. 4, the next baffle 124B has the blocks 140B on the opposite side of the tube row 122 so that the flue gas travels transversely through the tube row 122 and around the tubes 120. The next baffle 124C alternates the blocks 140B to the same side as baffle 124A (FIG. 3). While three baffles 124A, 124B, 124C are preferred, this pattern of alternating the passageway blocks 140B continues for any additional baffles that may be present. In this manner, convection makes a significant contribution to heating the tubes 120, improving efficiency, and reducing the needed length of the tubes 120 in the radiant section 112.

If desired, the thickness of the refractory lining 104A between the baffles 124A, 124B, 124C and the cylindrical shell of the radiant section 112, may be less than the general thickness of the adjacent refractory lining 104 (FIGS. 1, 3, 4) on either side of the baffles 124A, 124B, 124C, so that the step 104B holds the axial position of the baffles 124A, 124B, 124C.

The convection section 150 is preferably oriented transversely with respect to the radiant section 112 on a side opposite from the flue gas passages in the blocks 140B to direct the flue gas 110 across the tubes 120. If desired, the radiant section 112 and the convection section 150 may be provided with respective mating connections, e.g., flanges 119, 152, to facilitate field assembly, e.g., following separate transportation of each unit. The spacing between the last baffle 124C and the outlet end wall 126 of the radiant section 112 preferably corresponds to the width of the convection section 150.

The convection section 150 is similarly lined with the refractory material 104, however, it may be thinner or have different characteristics suitable for the lower temperatures generally seen in the convection section. A plurality of coils 154 are disposed in the convection section 150 in heat exchange relation with the flue gas 110 to preheat the feed gas. Auxiliary coils 156 may be present in the convection section 150 for additional heat recovery to heat other process streams, e.g., a steam cracker, hydrocracker, and/or Fischer-Tropsch synthesis reactor charge streams, at the inlet and outlet connections 156A, 156B.

An air preheater 158 may also be present in the convection section. Cooled flue gas is then discharged through stack 160, which may be provided with a rain hood 162 (FIGS. 5-6) to inhibit water entry. Combustion air is drawn in through an air intake 164, the combustion air preheater 158, and then duct 166 to fan 168. If desired, flue gas recirculation duct 170 and damper 172 may direct a portion of the flue gas from the convection section 150 into the duct 166 to facilitate NOx reduction. The fan 168 forces a draft through duct 174 to burner 106 to support combustion of fuel gas from line 107 in the combustion chamber 102 as described previously.

Figure 2:
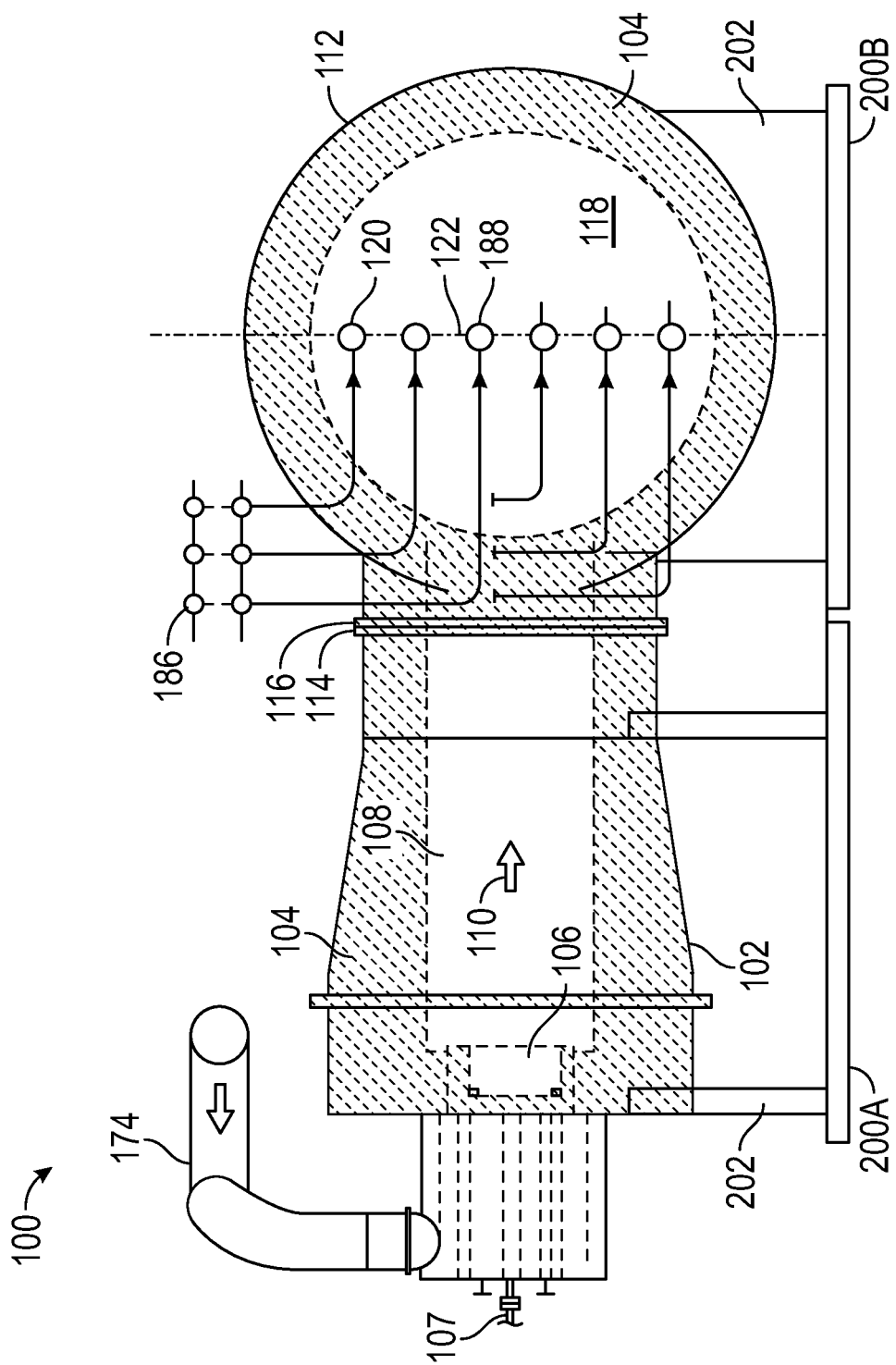
FIG. 2 is an end elevational view of the reformer of FIG. 1 as seen along the view lines 2-2.
Figure 6:
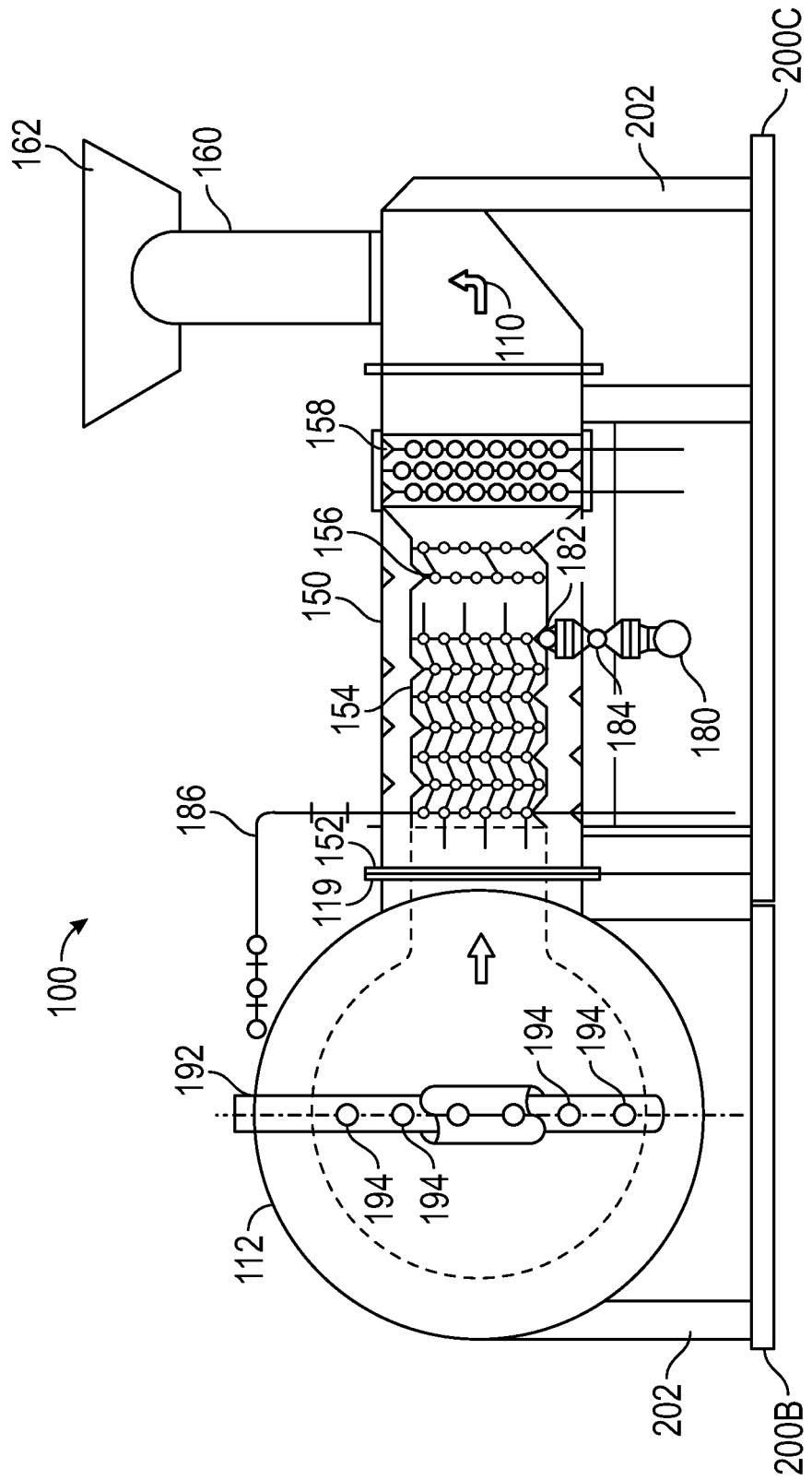
FIG. 6 is an end elevational view of the reformer of FIG. 1 as seen along the view lines 6-6.
Figure 7:
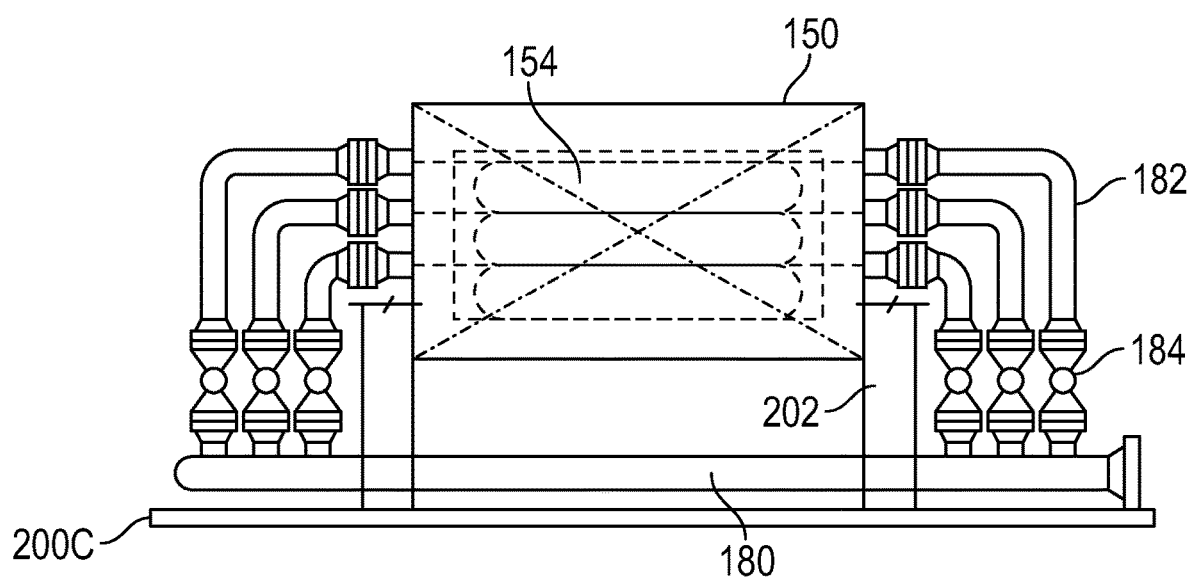
FIG. 7 is a cross-sectional view of the convection section of the reformer of FIG. 1 as seen along both view lines 7-7.

As best seen in FIG. 7, the feed gas mixture is supplied to the coils 154 via manifold 180, a plurality of inlet lines 182, and a like plurality of control valves 184. Then, as seen in FIGS. 1 and 2, the heated feed gas exits the coils 154, passes through respective insulated crossovers 186 routed along the radiant section 112, to tube inlets 188, and then into respective radiant tubes 120 passing through the radiant section 112 as described above, where it is converted to syngas. As seen in FIGS. 1 and 6, the syngas exits the radiant section 112 through tube outlets 190 and is collected in the radiant outlet manifold 192.

In this manner, the feed gas passes separately through each of the coils 154 and radiant tubes 120 for independent control. If desired, temperature sensors 194 may be positioned to detect the temperatures in the respective radiant tube outlets 190. In general, the temperature in one of the outlets 190 may be independently controlled by regulating the amount of feed gas entering the respective coils 154 by adjusting the associated control valve 184, either manually or automatically, e.g., using a PID controller (not shown) receiving a signal from the temperature sensor and transmitting a control signal to the control valve 184.

Figure 9:
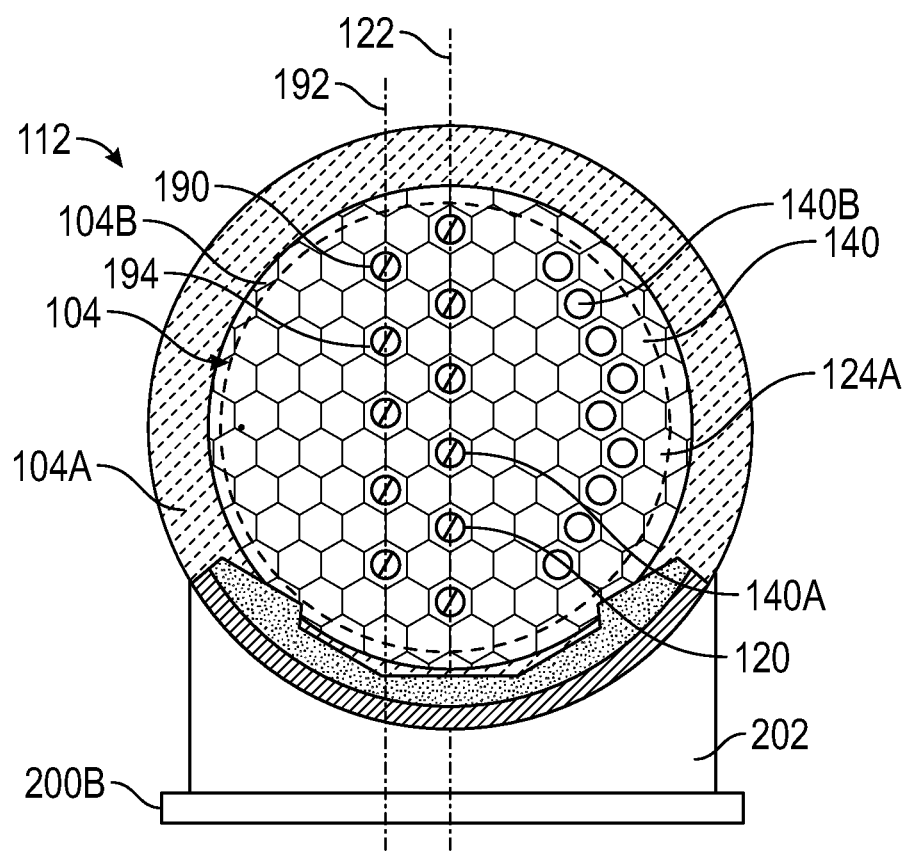
FIG. 9 is a cross-sectional view of an alternate configuration of the radiant section of the reformer of FIG. 1 as seen along the view lines 3-3.

As seen in FIG. 9, one or more additional or supplemental tubes 190 may be present in the radiant section 112. These are preferably aligned in one or more rows 192 to pass through respective blocks 194 in a manner analogous to blocks 140A, and can be offset in elevation between adjacent ones of the tubes 120. The tubes 190 can be located upstream or downstream from the tubes 120 in the flue gas flow. The tubes 190 can be horizontal through the radiant section 112, and may contain structured catalyst 130 (see FIG. 8) as in tubes 120. The tubes 190 can be used for steam reforming additional methane as in tubes 120, or can be used to heat other process streams, e.g., for steam cracking, hydrocracking, Fischer-Tropsch synthesis, and so on, including combinations of these. Steam cracking normally requires a temperature of 850° C. or more. Conventional reformers do not normally operate at a sufficiently high temperature for steam cracking, but the radiant section 112 of the micro SMR 100 disclosed herein can be operated to obtain a temperature in the process fluid in the tubes 190 at or above 850° C. to permit reforming and steam cracking in the same reactor.

The tubes 120 and the tubes 190 preferably have about the same length, e.g., a maximum radiant-heated length less than 12 m, more preferably less than or equal to about 10 m, and especially less than or equal to about 8 m.

The micro SMR 100 can, if desired, be constructed off-site in an appropriate fabrication facility(ies) in one or assembled, partially assembled, or unassembled modules, transported to the construction site, optionally on one or more skid frames 200A, 200B, 200C (FIGS. 1-7), and assembled and/or connected together on site. For example, where the combustion chamber 102 and associated equipment are attached to the skid frame 200A, the convection section 112 and associated equipment attached to the skid frame 200B, and the convection section 150 and associated equipment are attached to skid frame 200C, the field assembly may comprise attaching the skid frames 200A, 200B, 200C together and connecting their respective equipment, e.g., connection of the field joints at flange pairs 114, 116 and 119, 152 to connect the convection section 112 to the combustion chamber 102 and to the convection section 150, connection of the crossovers 186 to the radiant section 112 and/or convection section 150, and connection of the duct 174 to the burner 106 and/or fan 168.

The modules and/or skid frames preferably have a maximum length less than 12 m, more preferably less than about 10 m, and especially less than or equal to about 9 m.

As desired, some components may be shipped unassembled, either separately, or temporarily secured on the skid frame(s) 200A, 200B, 200C, e.g., via one or more supports 202, and assembled on site, e.g., duct 174, fan 168, stack 160, crossovers 186, etc. The micro SMR 100 can also, as desired, be connected to other equipment, such as, for example, a fuel source can be connected to line 107, a feed gas source to manifold 180, a product receiving line to manifold 192, as well as any needed utilities, instrumentation, etc.

If desired, a control panel 204 can be located adjacent the combustion chamber 102, e.g., on skid frame 200A, for local control of the fuel gas supply 107, fan 168, damper 172, valves 182, and so on. The fuel gas control, for example, may comprise PID controllers and/or manual valves to supply a pilot and/or the main fuel supply 107.

Embodiments Listing

Accordingly, the present disclosure provides the following embodiments.

1. A steam methane reformer comprising:

a combustion chamber in communication with a longitudinal radiant section to supply flue gas from a burner, preferably a single burner, to the radiant section;

a horizontal tube passing longitudinally through the radiant section;

catalyst, preferably a structured catalyst, disposed in the tube to reform a feed gas comprising hydrocarbon and steam a refractory lining in the radiant section for radiant heat transfer to the tube; and at least one baffle in the radiant section to direct a flow path of the flue gas transversely across the horizontal tube for convective heat transfer to the tube.

2. The steam methane reformer of Embodiment 1 further comprising:

a row of a first plurality of the horizontal tubes passing through the radiant section in spaced relation with the burner, preferably to avoid flame impingement, or preferably wherein the burner provides flameless combustion;

a plurality of the baffles comprising transverse ceramic walls spaced along the radiant section; a first set of openings formed in each ceramic wall to receive and support the row of tubes; and a passageway, preferably a second set of openings, formed through each ceramic wall on alternating sides of the tubes for cross-flow of the flue gas through the tube row.

3. The reformer of Embodiment 1 or Embodiment 2 wherein the baffles comprise hexagonal blocks, preferably interlocking ceramic blocks.

4. The reformer of any of Embodiments 1 to 3 further comprising a plurality of coils disposed in a convection section to preheat the feed gas, and a like plurality of crossovers to supply the preheated feed gas to respective ones of the horizontal tubes.

5. The reformer of Embodiment 4 further comprising respective temperature control systems to separately control the temperature of effluent from each of the horizontal tubes.

6. The reformer of Embodiment 5 wherein the control systems each comprise a temperature sensor to detect the temperature in the effluent from one of the tubes and a valve positioned between a feed gas manifold and a respective coil to regulate the supply of feed gas to the respective coil in response to the detected effluent temperature.

7. The reformer of any of Embodiments 2 to 6 further comprising a second plurality, preferably in a row, of horizontal tubes passing longitudinally through the radiant section between the alternating second sets of openings.

8. The reformer of Embodiment 7 wherein the second plurality or row of tubes comprise the structured catalyst disposed therein to reform the feed gas comprising methane and steam.

9. The reformer of Embodiment 7 wherein the second plurality or row of tubes is selected from steam cracking tubes, hydrocracking tubes, Fischer-Tropsch synthesis tubes, or a combination thereof.

10. The reformer of any of Embodiments 1 to 9 wherein the combustion chamber is oriented transversely with respect to the radiant section, preferably vertically above the radiant section to reduce plot space, or horizontally adjacent the radiant section to facilitate transportation and/or field assembly.

11. The reformer of any of Embodiments 1 to 10 further comprising a convection section oriented transversely with respect to the radiant section to receive flue gas from the radiant section.

12. The reformer of any of Embodiments 1 to 11 further comprising a fan to draw air from an intake, through an air preheater disposed in a convection section in heat exchange relation with the flue gas, and to force the preheated air into the combustion chamber.

13. The reformer of Embodiment 12 further comprising a flue gas recycle line to pass a portion of the flue gas from the convection section to the fan.

14. The reformer of any of Embodiments 1 to 13 further comprising a supplemental heat transfer loop through a convection section to recover heat for another process stream.

15. The reformer of Embodiment 14 wherein the other process stream comprises feedstock to a steam cracker, hydrocracker, Fischer-Tropsch synthesis reactor, or a combination thereof.

16. The reformer of any of Embodiments 1 to 15 further comprising:

a convection section receiving the flue gas from the radiant section in heat exchange relation with a combustion air preheater, a feed gas preheater, another process stream, or a combination thereof and a stack to discharge the flue gas from the convection section.

17. The reformer of any of Embodiments 1 to 16 comprising a plurality of modules for independent transportation to a construction site.

18. A skid frame-mountable micro steam methane reformer comprising:

a combustion chamber module and a convection section module having ends mateable in transverse orientation for connection to respective first and second ends of a radiant section module;

wherein the combustion chamber module comprises a combustion chamber to supply flue gas from a burner, preferably a single burner, to the radiant section module when connected thereto;

wherein the radiant section module comprises:

a radiant section;

a horizontal tube passing longitudinally through the radiant section;

a refractory lining in the radiant section for radiant heat transfer to the tube;

at least one baffle in the radiant section to direct a flow path of the flue gas transversely across the horizontal tube for convective heat transfer to the tube; and a structured catalyst disposed in the tube to reform a feed gas comprising hydrocarbon and steam;

wherein the convection section module comprises a convection section oriented transversely with respect to the radiant section to pass flue gas from the radiant section, when connected, thereto in heat exchange relation with a combustion air preheater, a feed gas preheater, another process stream, or a combination thereof and optionally, one or more skid frames for mounting the combustion chamber, the radiant section, the convection section, or a combination thereof.

19. A process comprising:

connecting a combustion chamber to communicate with a longitudinal radiant section to supply flue gas from a burner in the combustion chamber, preferably a single burner;

passing a horizontal tube longitudinally through the radiant section;

lining the radiant section with a refractory material for radiant heat transfer to the tube;

installing at least one baffle in the radiant section to direct a flow path of the flue gas transversely across the horizontal tube for convective heat transfer to the tube; and disposing a structured catalyst in the tube to reform a feed gas comprising hydrocarbon and steam.

20. The process of Embodiment 19 further comprising:

spacing a row of a first plurality of the horizontal tubes passing through the radiant section from the burner, preferably to avoid flame impingement, preferably wherein the burner is flameless;

spacing a plurality of the baffles comprising transverse ceramic walls along the radiant section;

forming a first set of openings in each ceramic wall to receive and support the row of tubes; and forming a passageway, preferably a second set of openings, through each ceramic wall on alternating sides of the tubes for cross-flow of the flue gas through the tube row.

21. The process of Embodiment 19 or Embodiment 20 further comprising assembling the baffles from interlocking ceramic blocks, preferably hexagonal blocks.

22. The process of Embodiment 20 or Embodiment 21 further comprising disposing a plurality of coils in a convection section to preheat the feed gas, and a like plurality of crossovers to supply the preheated feed gas to respective ones of the tubes in the row.

23. The process of Embodiment 22 further comprising independently controlling temperature of effluent from each of the horizontal tubes.

24. The process of Embodiment 23 further comprising detecting the temperature in the effluents from the tubes and, in response to the detected effluent temperatures, regulating the supply of feed gas to the respective coils, preferably using valves positioned between a feed gas manifold and respective coils.

25. The process of any of Embodiments 20 to 24 further comprising passing a second plurality, preferably in a row, of horizontal tubes longitudinally through the radiant section between the alternating second sets of openings.

26. The process of Embodiments 25 further comprising reforming the feed gas comprising methane and steam in the second plurality or row of tubes.

27. The process of Embodiment 25 further comprising supplying a steam cracking feedstock, a hydrocracking feedstock, Fischer-Tropsch feedstock, or a combination thereof, to the second plurality or row of tubes.

28. The process of Embodiment 25 further comprising supplying a steam cracking feedstock to the second plurality or row of tubes, and operating the radiant section at a temperature equal to or greater than 850° C.

29. The process of any of Embodiments 19 to 28 further comprising orienting the combustion chamber transversely with respect to the radiant section, preferably vertically above the radiant section to reduce plot space, or horizontally adjacent the radiant section to facilitate shipping and/or field assembly.

30. The process of any of Embodiments 19 to 29 further comprising orienting a convection section transversely with respect to the radiant section to receive flue gas therefrom.

31. The process of any of Embodiments 19 to 30 further comprising installing a fan to draw air from an air intake, through an air preheater disposed in a convection section in heat exchange relation with the flue gas, and to force the preheated air into the combustion chamber.

32. The process of Embodiment 31 further comprising recycling a portion of the flue gas from the convection section into the preheated air drawn into the fan.

33. The process of any of Embodiments 19 to 32 further comprising heating another process stream in a supplemental heat transfer loop through a convection section.

34. The process of Embodiment 33 wherein the other process stream comprises feedstock to a steam cracker, hydrocracker, Fischer-Tropsch synthesis reactor, or a combination thereof.

35. The process of any of Embodiments 19 to 34 further comprising:

heating combustion air, feed gas, another process stream, or a combination thereof in a convection section receiving the flue gas from the radiant section; and discharging the flue gas from the convection section into a stack.

36. The process of any of Embodiments 19 to 35 wherein the flue gas entering the radiant section from the combustion chamber has a temperature greater than 1500° C., preferably about 1540° C. to 1650° C.; wherein the flue gas discharged from the stack has a temperature greater than 100° C., preferably about 120° C. to 150° C.; wherein the feed gas entering the radiant section has a temperature greater than 600° C., preferably about 600° C. to 750° C.; wherein product effluent exiting the tubes from the radiant section has a temperature from 800° C. to 1000° C., preferably about 850° C. to 950° C.; or a combination thereof.

37. The process of any of Embodiments 19 to 36 wherein the combustion chamber and the radiant section are pre-assembled and transported to a construction site in separate first and second modules, and connected together at the construction site.

38. The process of Embodiment 37 further comprising pre-assembling and transporting a convection section module to the construction site in a separate third module, and connecting the convection section module to the radiant section module at the construction site.

39. The process of Embodiment 38 further comprising pre-assembling and transporting a stack module to the construction site, and connecting the stack module to the convection section module at the construction site.

40. The invention of any preceding embodiment wherein the reformer is a steam methane reformer and the feed gas comprises methane.

41. The invention of any preceding embodiment wherein the reformer produces syngas at a capacity for making between 1 and 100 BPD of liquid hydrocarbons in a Fischer-Tropsch gas-to-liquid (GTL) process, preferably equal to or less 50 BPD, more preferably equal to or less than 25 BPD.

42. The invention of any preceding embodiment wherein the hydrocarbon feed rate to the reformer is from about 20 kg/h (44 lb/h) to about 2300 kg/h (5070 lb/h), preferably less than about 1150 kg/h (2540 lb/h), and more preferably less than about 600 kg/h (1320 lb/h), especially where the hydrocarbon is methane.

43. The invention of any preceding embodiment wherein the skid and/or module have a length less than 12 m, preferably less than about 10 m, and especially equal to or less than about 9 m.

44. The invention of any preceding embodiment wherein the tube(s) have a length less than 12 m, preferably less than about 10 m, and especially equal to or less than about 8 m.

45. The invention of any preceding embodiment wherein the reformer is operated with a methane slip less than 10 mole percent, preferably less than 5 mole percent, based on the total moles of product gas on a dry basis.

Examples

Two micro SMR units are designed according to FIGS. 1-8 with the design and simulated operating parameters as shown in Table 1 below, with the radiant section 112 having a heated tube length of 6.1 m (20 ft) and tube 120 inside diameters of 57.2 mm (2.25 in.) and 71 mm (2.8 in.). The baffles 124A, 124B, 124C are constructed from 6-in. Blasch® hex blocks, with appropriate size passages in blocks 140A, 140B. The catalyst inserts are CATACEL SSR structured catalyst of the fan-washer type shown in FIG. 8. These examples demonstrate the feasibility of horizontally oriented short tubes in a low capacity reformer with high efficiency and low methane slip.

TABLE 1

| MICRO SMR DESIGN PARAMETER EXAMPLES | | |
|---|---|---|
| Parameter | Example 1 | Example 2 |
| SMR Radiant Section Design | | |
| Number of tubes | 6 | 5 |
| Orientation | Horizontal | Horizontal |
| Catalyst insert | CATACEL SSR | CATACEL SSR |
| Catalyst metal | Ni—Rh | Ni—Rh |
| Radiant tube OD, mm (in.) | 82.6 (3.25) | 101.6 (4.00) |
| Radiant tube ID, mm (in.) | 57.2 (2.25) | 71.1 (2.80) |
| Radiant tube heated length (ft) | 6.1 (20) | 6.1 (20) |
| Number of baffles | 3 | 3 |
| SMR Process Operating Parameters | | |
| Hydrocarbon feed rate, kg/h (lb/h) | 536.6 (1183) | 536.6 (1183) |
| Stearm:carbon ratio (gmol/gmol) | 2.23 | 2.23 |
| Hydrogen - product gas (mol %, dry) | 54.4 | 54.0 |
| Methane - product gas (mol %, dry) | 4.48 | 4.88 |
| Total flue gas flow, kg/h (lb/hr) | 1954 (4309) | 1954 (4309) |
| Process gas - inlet T (° F.) | 666 (1230) | 666 (1230) |
| Product gas - outlet T, ° C. (° F.) | 882 (1620) | 878 (1613) |
| Pressure -inlet, MPa (psi) | 3.10 (450) | 3.10 (450) |
| Pressure - outlet, MPa (psi) | 2.88 (417) | 2.95 (428) |
| Pressure drop, MPa (psi) | 0.228 (33) | 0.152 (22) |
| SMR Heat Transfer | | |
| Firing rate, MW (×$10^6$ BTU/hr) | 1.19 (4.06) | 1.19 (4.06) |
| Total heat input, MW ($10^6$ BTU/hr) (includes sensible heat from air and fuel) | 1.39 (4.73) | 1.39 (4.73) |
| Net heat absorbed in radiant section, MW ($10^6$ BTU/hr) | 0.668 (2.28) | 0.654 (2.23) |
| Adiabatic flame temperature, ° C. (° F.) | 1913 (3476) | 1913 (3476) |
| Flue gas bulk T - outlet, ° C. (° F.) | 1028 (1882) | 1056 (1932) |
| Maximum outside tube wall T, ° C. (° F.) | 1024 (1875) | 1034, (1893) |
| Average heat flux, KW/$m^2$ | 70.3 | 67.2 |

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

What is claimed is:

1. A reformer comprising:
   a combustion chamber in communication with a longitudinal radiant section to supply flue gas from a burner to the radiant section;
   a horizontal tube passing longitudinally through the radiant section;
   catalyst disposed in the horizontal tube to reform a feed gas comprising hydrocarbon and steam;
   a refractory lining in the radiant section for radiant heat transfer to the horizontal tube; and
   at least one baffle in the radiant section to direct a flow path of the flue gas transversely across the horizontal tube for convective heat transfer to the horizontal tube.

2. The reformer of claim 1 further comprising:
   one or a plurality of the horizontal tubes passing longitudinally through the radiant section;
   wherein the radiant section comprises a refractory lining for radiant heat transfer to the horizontal tube(s);
   wherein the combustion chamber is transversely oriented with respect to the radiant section;
   wherein the burner provides flameless combustion or provides a flame spaced sufficiently to avoid flame impingement on the tube(s);
   wherein the catalyst comprises a structured catalyst; and
   a transversely oriented convection section to pass the flue gas from the radiant section in heat exchange relation with a combustion air preheater to provide preheated air to the burner, and with a feed gas preheater to supply preheated feed gas to the tubes.

3. The reformer of claim 1, wherein the combustion chamber is transversely oriented with respect to the radiant section, and further comprising a plurality of the horizontal tubes passing through the radiant section in spaced relation with the burner to avoid flame impingement, or wherein the burner provides flameless combustion.

4. The reformer of claim 1, further comprising:
   a plurality of the baffles, wherein the baffles comprise transverse ceramic walls spaced along the radiant section;
   a first set of openings formed in each ceramic wall to receive and support the horizontal tube; and
   a passageway comprising a second set of openings formed through each ceramic wall on alternating sides of the tube for cross-flow of the flue gas across the tube.

5. The reformer of claim 4 wherein the baffles comprise hexagonal blocks.

6. The reformer of claim 1 further comprising a transversely oriented convection section to pass the flue gas from the radiant section in heat exchange relation with a combustion air preheater to provide preheated combustion air to the burner, and/or in heat exchange relation with a feed gas preheater to supply preheated feed gas to the tubes.

7. The reformer of claim 6, further comprising:
wherein the feed gas preheater comprises a plurality of coils disposed in the convection section; and
a like plurality of crossovers to supply the preheated feed gas from the coils to respective ones of the horizontal tubes.

8. The reformer of claim 7 further comprising respective temperature control systems to independently control the temperature of effluent from each of the horizontal tubes wherein the control systems each comprise a temperature sensor to detect the temperature in the effluent from one of the tubes and a valve positioned between a feed gas manifold and a respective coil to regulate the supply of feed gas to the respective coil in response to the detected effluent temperature.

9. The reformer of claim 1 comprising a plurality of the horizontal tubes passing longitudinally through the radiant section, and a plurality of supplemental tubes passing longitudinally through the radiant section.

10. The reformer of claim 3 wherein the combustion chamber is oriented vertically above the radiant section to reduce plot space.

11. The reformer of claim 6 wherein the combustion chamber is oriented transversely to a side of the radiant section, and the convection section is oriented transversely on the same side of the radiant section.

12. The reformer of claim 6 further comprising a fan to draw air from an intake, through the air preheater, and to force the preheated air into the combustion chamber, and further comprising a flue gas recycle line to pass a portion of the flue gas from the convection section to the fan.

13. The reformer of claim 6 further comprising a supplemental heat transfer loop through the convection section to recover heat for another process stream, wherein the other process stream comprises feedstock to a steam cracker, hydrocracker, Fischer-Tropsch synthesis reactor, or a combination thereof.

14. The reformer of claim 6 further comprising a stack to discharge the flue gas from the convection section.

15. The reformer of claim 1, further comprising a plurality of modules for independent transportation to a construction site.

16. A skid frame-mountable micro reformer comprising:
a combustion chamber module comprising a burner in a combustion chamber to supply flue gas;
a radiant section module comprising:
a longitudinal radiant section;
a horizontal tube passing longitudinally through the radiant section;
a refractory lining in the radiant section for radiant heat transfer to the tube;
at least one baffle in the radiant section to direct a flow path of the flue gas transversely across the horizontal tube for convective heat transfer to the tube; and
a structured catalyst disposed in the tube to reform a feed gas comprising hydrocarbon and steam;
a convection section module comprising a convection section to pass flue gas from the radiant section in heat exchange relation with a combustion air preheater and a feed gas preheater;
wherein the combustion chamber and the convection section have ends mateable in transverse orientation for connection to respective first and second ends of the radiant section;
optionally, one or more skid frames for mounting the combustion chamber module, the radiant section module, the convection section module, or a combination thereof.

17. A reforming process to produce synthesis gas, comprising:
supplying flue gas to a longitudinal radiant section of a reformer from a burner in a combustion chamber in communication with the radiant section;
reforming a feed gas comprising hydrocarbon and steam in a horizontal tube comprising catalyst disposed therein and passing longitudinally through the radiant section;
transferring radiant heat to the horizontal tube from a refractory lining in the radiant section; and
directing a flow path of the flue gas transversely across the horizontal tube with at least one baffle in the radiant section for convective heat transfer to the horizontal tube.

18. The reforming process of claim 17 further comprising:
radiant heat transfer to one or a plurality of the horizontal tubes passing though the radiant section;
wherein the combustion chamber is transversely oriented with respect to the radiant section;
wherein the burner provides flameless combustion or provides a flame spaced sufficiently from the horizontal tube(s) to avoid flame impingement;
reforming a feed gas comprising hydrocarbon and steam on a structured catalyst disposed in the tubes; and
passing the flue gas from the radiant section to a transversely oriented convection section in heat exchange relation with a combustion air preheater to provide preheated air to the burner, and in heat exchange relation with a feed gas preheater to supply preheated feed gas to the horizontal tube(s).

19. The reforming process of claim 17, further comprising orienting the combustion chamber transversely with respect to the radiant section, and spacing a plurality of the horizontal tubes passing through the radiant section in relation to the burner to avoid flame impingement or providing flameless combustion from the burner.

20. The reforming process of claim 17, further comprising:
spacing a plurality of the baffles along the radiant section, wherein the baffles comprise transverse ceramic walls;
receiving and supporting the tubes in a first set of openings formed in each ceramic wall; and
forming a passageway comprising a second set of openings through each ceramic wall on alternating sides of the tubes for cross-flow of the flue gas across the tubes.

21. The process of claim 20 further comprising assembling the ceramic walls from hexagonal blocks.

22. The process of claim 17 further comprising passing the flue gas from the radiant section to a transversely oriented convection section in heat exchange relation with a combustion air preheater to provide preheated combustion air to the burner, and/or in heat exchange relation with a feed gas preheater to supply preheated feed gas to the tubes.

23. The process of claim 22, further comprising:
wherein the feed gas preheater comprises a plurality of coils disposed in the convection section; and
supplying the preheated feed gas from the coils through a like plurality of crossovers to respective ones of the horizontal tubes.

24. The process of claim 23 further comprising independently controlling the temperature of effluent from each of the horizontal tubes with respective temperature control systems, wherein the control comprises detecting a temperature in the effluent from one of the tubes with a temperature sensor of the control system, and regulating the supply of feed gas to the respective coil in response to the detected effluent temperature using a valve positioned between a feed gas manifold and a respective coil.

25. The process of claim 17 further comprising passing a plurality of the horizontal tubes longitudinally through the radiant section, and passing a plurality of supplemental tubes longitudinally through the radiant section.

26. The process of claim 19 further comprising orienting the combustion chamber vertically above the radiant section to reduce plot space, or horizontally to facilitate transportation and/or field assembly.

27. The process of claim 22 further comprising orienting the combustion chamber transversely to a side of the radiant section, and orienting the convection section transversely on the same side of the radiant section.

28. The process of claim 22, further comprising drawing air from an intake, through the air preheater, to a fan, and forcing the preheated air into the combustion chamber, and further comprising passing a portion of the flue gas from the convection section through a flue gas recycle line to the fan.

29. The process of claim 22 further comprising recovering heat from a supplemental heat transfer loop through the convection section for another process stream.

30. The process of claim 22 further comprising discharging the flue gas from the convection section to a stack.

31. The process of claim 22, further comprising transporting the reformer to a construction site as a plurality of modules, and optionally assembling the reformer on a skid.

32. The process of claim 31 further comprising supplying the syngas from the reformer to a Fischer-Tropsch synthesis process to produce liquid hydrocarbons.

33. A method comprising:
   connecting a combustion chamber to communicate with a longitudinal radiant section to supply flue gas from a burner in the combustion chamber;
   passing a horizontal tube longitudinally through the radiant section;
   lining the radiant section with a refractory material for radiant heat transfer to the tube;
   installing at least one baffle in the radiant section to direct a flow path of the flue gas transversely across the horizontal tube for convective heat transfer to the tube; and
   disposing a structured catalyst in the tube to reform a feed gas comprising hydrocarbon and steam.

34. The reformer of claim 9 wherein the horizontal tubes and the supplemental tubes are arranged in respective rows, wherein the plurality or row of supplemental tubes comprise structured catalyst disposed therein to reform the feed gas, or are selected from steam cracking tubes, hydrocracking tubes, Fischer-Tropsch synthesis tubes, or a combination thereof.

35. The reformer of claim 3 wherein the combustion chamber is oriented horizontally to facilitate transportation and/or field assembly.

36. The reformer of claim 11 wherein the combustion chamber and convection section are oriented horizontally.

37. The process of claim 25 wherein the horizontal tubes and the supplemental tubes are arranged in respective rows, wherein the plurality or row of supplemental tubes comprise structured catalyst disposed therein to reform the feed gas, or are selected from steam cracking tubes, hydrocracking tubes, Fischer-Tropsch synthesis tubes, or a combination thereof.

38. The process of claim 27 wherein the combustion chamber is oriented horizontally to facilitate transportation and/or field assembly.

39. The process of claim 27 wherein the combustion chamber and convection section are oriented horizontally.

* * * * *

UNITED STATES PATENT AND TRADEMARK OFFICE
CERTIFICATE OF CORRECTION

| | | |
|---|---|---|
| PATENT NO. | : 10,974,219 B2 | Page 1 of 1 |
| APPLICATION NO. | : 16/771846 | |
| DATED | : April 13, 2021 | |
| INVENTOR(S) | : Daniel Joseph Barnett | |

It is certified that error appears in the above-identified patent and that said Letters Patent is hereby corrected as shown below:

In the Specification

In Column 16, Line 10, delete "thereof" and insert -- thereof; --, therefor.

In Column 16, Line 42, delete "thereof" and insert -- thereof; --, therefor.

In Column 19, in "Table 1", under "SMR Process Operating Parameters", Line 2, delete "Stearm:" and insert -- Steam: --, therefor.

In Column 19, in "Table 1", under "SMR Heat Transfer", Line 8, delete "1034," and insert -- 1034 --, therefor.

In the Claims

In Column 22, in Claim 18, Line 22, delete "though" and insert -- through --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*